United States Patent [19]

Stern et al.

[11] Patent Number: 4,814,078
[45] Date of Patent: Mar. 21, 1989

[54] WATER FILTER CARTRIDGE

[75] Inventors: Richard J. Stern, Glencoe, Ill.; Alfons Rundzaitis, Beverly Shores, Ind.; Samuel F. Peterson, Chicago, Ill.

[73] Assignee: Associated Mills Inc., Chicago, Ill.

[21] Appl. No.: 96,906

[22] Filed: Sep. 15, 1987

[51] Int. Cl.⁴ .................... B01D 27/02; B01D 27/08
[52] U.S. Cl. ................................ 210/282; 210/288; 210/316; 210/438; 210/440; 210/443
[58] Field of Search ............... 210/264, 266, 282, 283, 210/287, 288, 314, 316, 438, 439, 440, 443

[56] References Cited
U.S. PATENT DOCUMENTS 3,504,796  4/1970  Bray ..................................... 210/266
4,504,389  3/1985  Rundzaitis ........................... 210/266
4,659,467  4/1987  Spearman ............................ 210/288
4,686,037  8/1987  Lang ..................................... 210/282
4,687,577  8/1987  Reuter et al. ........................ 210/288

Primary Examiner—Richard V. Fisher
Assistant Examiner—Wanda L. Millard
Attorney, Agent, or Firm—Laff, Whitesel, Conte & Saret

[57] ABSTRACT

A cartridge for a water filter system has a closed housing with only an inlet and an outlet formed in the lower surface thereof. A discharge tube extends from the outlet at the bottom, through the housing, to a position near the top of the housing. There, an elongated sleeve of filter material filters the water leaving the housing. The space between the inlet and the filter sleeve is filled with three different filter materials, most of which is activated charcoal.

9 Claims, 2 Drawing Sheets

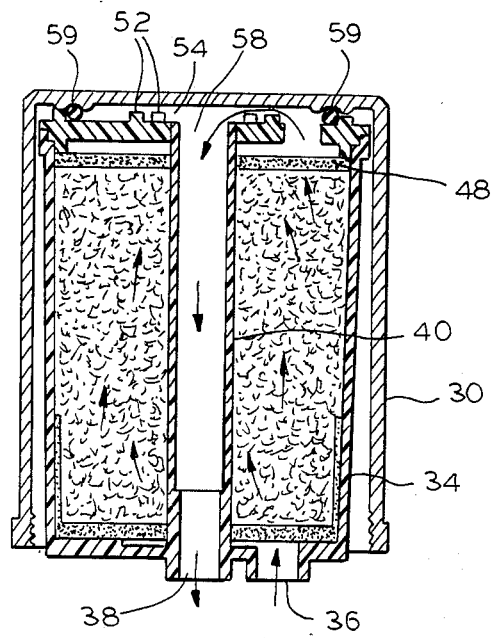
FIG. 4
(PRIOR ART)
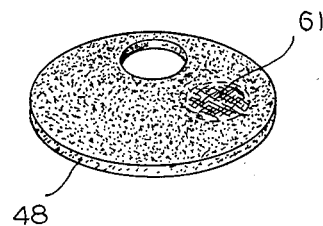
FIG. 5
(PRIOR ART)
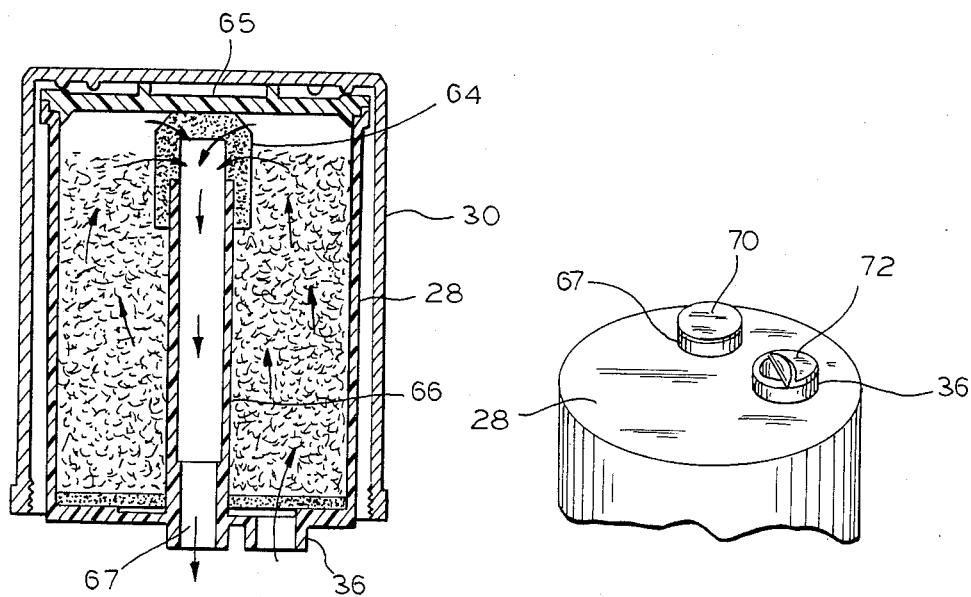
FIG. 6
FIG. 7

WATER FILTER CARTRIDGE

This invention relates to water filter cartridges and more particularly to cartridges which may be added to appliances attached to water faucets.

Known water filtering systems, of the inventive type, are arranged to be attached to water faucets, as at a kitchen sink, for example. These filtering systems include an appliance made of metal or plastic, which is attached to the outlet of the faucet. Mounted on this appliance is a cup or cover which may be removed in order to either install a new water filter cartridge or replace an old and spent cartridge. Then the cup or cover is replaced. A valve on the appliance may selectively divert the water flowing from the faucet into or away from the filter cartridge.

Herefore, the cartridges for this appliance have been constructed within a plastic housing containing one or more suitable filter materials. The plastic housing of the cartridge has an inlet on the bottom to enable an entrance of water which rises through the filter materials. At the top of the cartridge, the rising water has been discharged into a space between the top of the plastic housing and the inside of the cup or cover. From that space, the water ran through a discharge port on the top of the filter and down a discharge pipe or tube extending through the filter materials to an outlet part, from which the water issues.

This cartridge design introduces two problems. First, the inside of the cup or cover (which is not sealed in the factory) becomes part of the water path. Therefore, it is possible to drop something into the inside of the cup or cover and, possibly contaminate the water flowing through the filter. Second, the plastic housing and the cup or cover are different materials which introduces a number of problems such as a possible creation of galvanic currents, erosion of materials, or the like.

At a bare minimum, if nothing else, the manufacturer loses control over the filtration which occurs within the filter. Therefore, if a consumer does anything unwise which results in any kind of contamination, the manufacturer faces a potential product liability litigation. Even if the manufacturer eventually proves that the damage was caused by the consumer's own negligence or unwise action, a substantial cost of litigation may have been experienced.

Beyond these fairly apparent reasons for providing an improved water filtering system, the prior system tended to concentrate the flow through choke points where contaminates which are filtered from the water tend to collect. It would be better to spread the water more evenly over a larger area.

Thus, there is a need for new and improved water filter cartridges which are completely sealed and which distribute the flow of filtered water in a better manner.

Accordingly, an object of the invention is to provide new and improved water filtering cartridges. Here, an object is to provide cartridges which are completely sealed at the factory so that there is no uncontrolled passageway within the filtering system where a consumer may spill something. Still another object is to reduce choke points in the filtering system where contaminants may collect.

Another object of the invention is to eliminate paths through unanticipated dissimilar materials within the filtering system.

Still another object is to provide a cartridge which is compatible with appliances and existing hardware which are already installed in the field.

In keeping with an aspect of the invention, these and other objects are accomplished by a completely factory sealed cartridge having only one inlet port at a point where water is introduced into the filtering system and one outlet port where water is discharged therefrom. The internal end of the discharge pipe is enclosed within the sealed housing and is covered by an elongated sleeve of filter material which distributes the filtration over a considerable area instead of concentrating it in a relatively small area, such as the cross section of the pipe.

The preferred embodiment of the invention will be understood best from the attached drawing wherein:

FIG. 4 is a cross-sectional view of the filter which schematically shows the water flow path within the prior art filter;

FIG. 5 is a perspective view of a disk of filter material which illustrates how a choke point forms where contaminants collect within the prior art filter;

FIG. 6 is a cross-section which illustrates the water flow path through the inventive sealed filter cartridge; and FIG. 7 shows factory installed seals at the inlet and outlet of the inventive cartridge.

Figure 1:
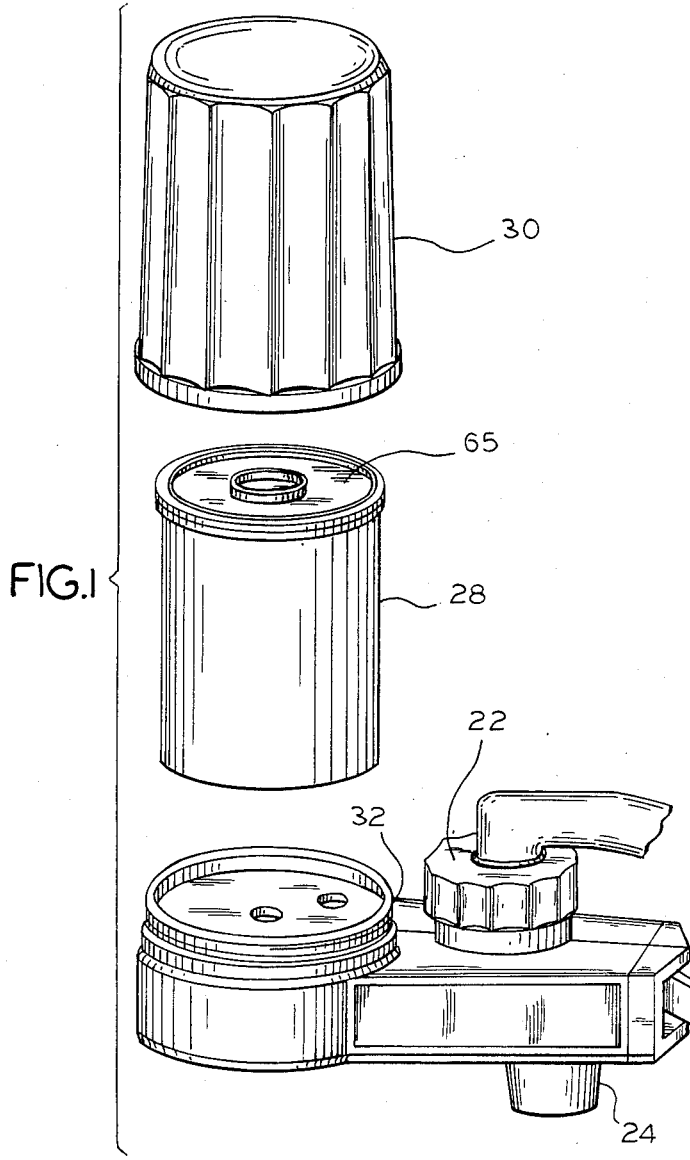
FIG. 1 is an exploded view of an appliance and the inventive cartridge.

In FIG. 1, an appliance assembly 20 is constructed to be attached to a faucet at 22 and to discharge water at 24. A two position valve handle 26 is arranged to discharge faucet water either directly through outlet 24 or through the filter cartridge 28 and then the outlet 24. The filter cartridge 28 is enclosed within a cup or cover 30 which is threaded to turn onto threads 32 on the appliance assembly 20. The dimensions and mounting means on the inventive cartridge 28 are identical to the dimensions and mounting means of pre-existing systems. Therefore, the inventive cartridge may be used in any appliance assembly which is already in the field.

Figure 2:
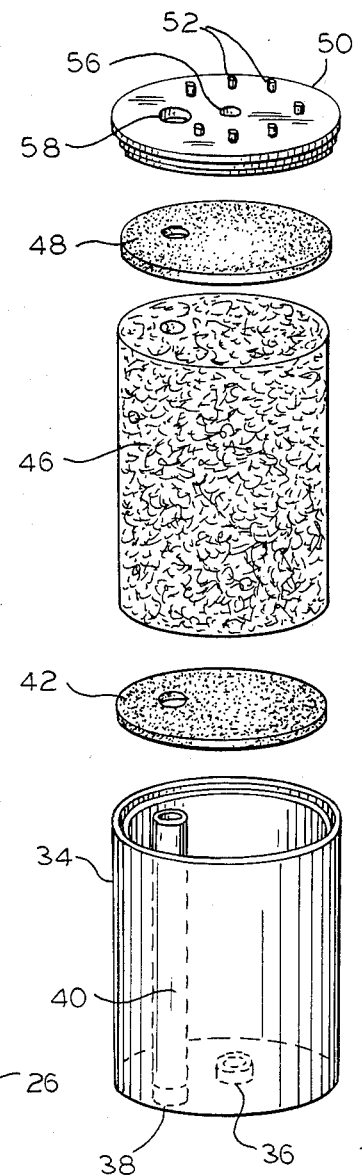
FIG. 2 is an exploded view of a prior art filter cartridge.

The prior art cartridge is shown in FIG. 2 as including a plastic housing 34 having on its lower surface an inlet port 36 and an outlet port 38. An upstanding discharge tube or pipe 40 is attached inside the bottom of the housing 34, at the outlet port 38. Inside the housing, there are three filtration stages, which are: a fibrous disk 42, activated charcoal 46, and a fibrous disk 48. These three filter materials fit into the housing 34. The upper end closing plate 50 is then ultra-sonically welded to the top of the enclosure 34. Upstanding upon the upper surface of plate 50 are a plurality of bosses 52 which ensure a minimum space 54 (FIG. 4) between the confronting inside surface of the cup or closure 30 and the top 50 of cartridge 34. A hole 56 is formed in the upper cover 50 of housing 34 for the water to pass through. Adjacent hole 56 is another hole 58 leading to discharge pipe 40.

The flow through the prior art filter cartridge is shown in FIG. 4. Water enters inlet 36 and rises through the filter materials under the influence of the existing water pressure. When it reaches the top of the cartridge 34, the water overflows, exiting outlet hole 56 in top 50. The water passes through the space 54 defined by an O-ring 59 and drains out hole 58 and discharge pipe 40, to outlet port 38. While in space 54, the water is exposed to an environment which is out of the control of the manufacturer and could be contaminated by the consumer. Also, the water is exposed to the metal or the other material used to make the cover or cup 30. Thus, for these and other reasons, the water filter is not always as sanitary or as trouble free as it could be.

It may be recalled that a fibrous disk filters 42, 48 are positioned below and above the charcoal to provide two of the three stages of filtering. Disk 42 at the bottom of the filter keeps any solid particles in the water supply from entering the inlet 36. The filter disk 48 at the top of the filter cartridge is internal to the filter. Charcoal particles 46 are pressed against the filter disk in the area immediately below outlet 56 which forms a choke point through which the out flow is concentrated. Therefore, in this immediate area 61 (FIG. 5) below outlet 56, charcoal particles and any other contaminants in the water tend to accumulate as is shown at 61 in FIG. 5. This concentrated area of contaminate accumulation may lead to a premature and at least partial failure of the filter.

Figure 3:
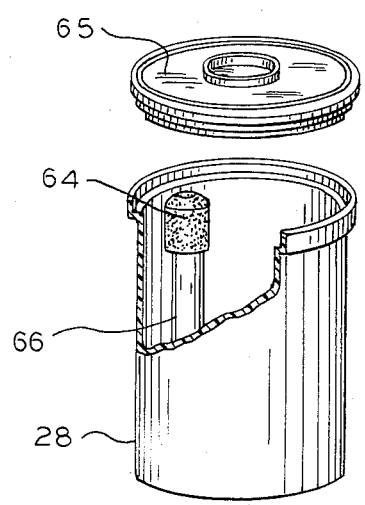
FIG. 3 is a perspective view of the inventive factory sealed cartridge, partially broken away to show an internal, elongated filter sleeve on the internal end of a discharge pipe.

According to the invention, the upper end 65 (FIGS. 1, 3, 6) of the filter enclosure 28 is a solid and unbroken member. FIG. 6 illustrates the water flow within the inventive enclosure. The discharge pipe 66 raises from a hole 67 in the bottom plate; however, the upper end of pipe 66 terminates below the upper surface 65. Thus, no water within the filter can escape from the enclosure 28.

On the upper end, pipe 66 is covered by an elongated sleeve 64 of filter material. Therefore, as the water rises inside the filter enclosure 28 it passes through the elongated sleeve 64 of filter material and out the discharge pipe 66. Instead of a filter disk, as in the prior art, with a choke point limited to the cross-sectional area 56 (FIG. 5) of the discharge pipe, there is a large and unconcentrated area over the surface of the sleeve 64. Thus, in the invention, there is substantially less chance that the output filter will become clogged, as compared to the area 61 on filter disk 48 of the prior art structure. Therefore, the filter may be manufactured and completely sealed while in a clean environment.

Simple adhesive paper disks 70, 72 (FIG. 7) may be stuck over the bottom of inlet 36 and outlet 67. Thereafter the entire filter system is sealed until the consumer removes these disks to install the filter cartridge.

Those who are skilled in the art will readily perceive how to modify the invention. Therefore, the appended claims are to be construed to cover all equivalent structures which fall within the true scope and spirit of the invention.

The invention which is claimed is:

1. A water filter system comprising an appliance assembly for attachment to a water faucet, water filter cartridge means enclosed within said appliance for filtering water passing from said faucet to a discharge port, said water filter cartridge means comprising a completely enclosed non-porous housing having an inside floor and with only an inlet port and an outlet port, said inlet and outlet ports being on the bottom surface of said enclosure, a discharge pipe raising from said outlet port through the interior of said housing to an intake port at an end of said pipe and at a location near the top and inside said completely enclosed housing enclosure whereby all water passing through said housing is retained within said completely enclosed housing and is not exposed to contaminants outside said housing while said water is in transit through said housing, and an elongated sleeve of filter material covering the intake port and the upper end of said discharge pipe.

2. The water filter system of claim 1 and three filter elements inside said housing, said sleeve being one of said three filter elements.

3. The water filter system of claim 2 wherein a first of said three filter elements is a fiber disk covering the inside floor of said housing and lying over said inlet, a second of said filter elements being activated charcoal rising to the inside top of said enclosure, and the third of said filter elements being said elongated sleeve of filter material.

4. A cartridge for a water filtering system, said cartridge comprising a housing formed by a closed non-porous cup having unbroken cylindrical side walls extending to and sealingly formed with an unbroken upper end wall, the side walls of said cup being closed on the bottom by sealing to an unbroken end wall having an inlet port and an outlet port formed therein, a discharge pipe attached and sealed to said bottom end wall and extending from said outlet port toward but not through said upper end wall whereby an end of said discharge pipe near said upper end wall forms an intake for the pipe leading to said outlet port, an elongated sleeve of filer material covering the upper end of said discharge pipe for filtering water entering said discharge pipe prior to leaving said housing via said discharge pipe, and filter material inside said housing to filter water passing from said inlet to said upper end of said discharge pipe with no part of the passage of said water through said filter being outside of said housing.

5. The cartridge of claim 4 wherein said filter material inside said housing comprises a fibrous disk covering said inlet and surrounding said outlet, and activated charcoal filling the space inside said housing.

6. A water filter cartridge for use in a housing of a faucet filter appliance, said cartridge having a non-porous housing that is completely sealed except for an inlet and an outlet positioned in adjacent position at only one end of said cartridge, a discharge tube extending from said outlet to a position remote from said outlet and within said completely sealed housing, an elongated sleeve of filter material covering at least the remote end of said discharge tube in order to filter all water entering said discharge tube, said sleeve being completely within said sealed housing, and filter material filling the remainder of said housing.

7. The cartridge of claim 6 wherein said filter material comprises activated charcoal.

8. The cartridge of claim 7 wherein said filter material also includes a sheet of fiber material covering said inlet.

9. The cartridge of claim 8 and adhesive means sealing the exterior sides of said inlet and said outlet until an installation of said cartridge.

* * * * *